United States Patent
Kammel et al.

[11] Patent Number: 6,007,061
[45] Date of Patent: Dec. 28, 1999

[54] UPPER MACPHERSON STRUT BEARING FOR WHEEL SUSPENSIONS IN A MOTOR VEHICLE

[75] Inventors: Helmut Kammel, Damme; Hubert Siemer, Dinklage; Ernst-Günther Jördens, Damme, all of Germany

[73] Assignee: Lemforder Metallwaren AG, Stemwede-Dielinger, Germany

[21] Appl. No.: 08/874,374

[22] Filed: Jun. 19, 1997

[30] Foreign Application Priority Data

Jun. 27, 1996 [DE] Germany .................. 196 25 585

[51] Int. Cl.⁶ .................................................. B60G 13/00
[52] U.S. Cl. ............... 267/220; 188/322.12; 188/321.11; 280/124.155
[58] Field of Search ..................... 267/153, 220, 267/292, 293, 294, 141.4; 280/660, 662, 697, 701, 124.146, 124.147, 124.145, 124.154, 124.155; 188/322.12, 321.11

[56] References Cited

U.S. PATENT DOCUMENTS

| | | | |
|---|---|---|---|
| 4,462,608 | 7/1984 | Lederman | 267/220 |
| 5,431,260 | 7/1995 | Gross et al. | 188/321.11 |
| 5,454,585 | 10/1995 | Dronen et al. | 267/220 |
| 5,467,971 | 11/1995 | Hurtubise et al. | 267/220 |
| 5,664,650 | 9/1997 | Kammel et al. | 188/321.11 |
| 5,788,462 | 8/1998 | Dazy et al. | 267/220 |

FOREIGN PATENT DOCUMENTS

| | | |
|---|---|---|
| 0 136 023 A2 | 10/1984 | European Pat. Off. . |
| 29 36 333 A1 | 9/1979 | Germany . |
| 41 04 859 C1 | 2/1991 | Germany . |
| 195 11 642 A1 | 10/1996 | Germany . |

Primary Examiner—Robert J. Oberleitner
Assistant Examiner—Thomas J. Williams
Attorney, Agent, or Firm—McGlew and Tuttle, PC

[57] ABSTRACT

An upper MacPherson strut step bearing for wheel suspensions in a motor vehicle. The MacPherson strut step bearing includes a metallic housing that is pot-shaped in the vertical section, a rubber buffer arranged in the housing, and a support piece, which can be connected to a shock absorber and protrudes with radially extending projections into the rubber buffer that is rigidly connected to it. A radially directed housing flange forms an abutment for an annular spring buffer made of an elastomeric material, against which the top end of a coil spring of the MacPherson strut, which coil spring surrounds the shock absorber, is supported. Recesses, which influence the axial damping characteristic of the MacPherson strut step bearing, are provided in the spring buffer. The metallic housing is connected to a cover plate, which passes over at the outer wall into a jacket ring, which is directed downward and projects beyond the spring buffer.

20 Claims, 3 Drawing Sheets

UPPER MACPHERSON STRUT BEARING FOR WHEEL SUSPENSIONS IN A MOTOR VEHICLE

FIELD OF THE INVENTION

The present invention pertains to an upper MacPherson strut step bearing for wheel suspensions in motor vehicles including a metallic housing that is pot-shaped in a vertical section, a rubber buffer arranged in the housing, and a support piece, which can be connected to a shock absorber and which protrudes with radially extending projections into the rubber buffer that is rigidly connected to it.

BACKGROUND OF THE INVENTION

DE 195 11 642 A1 discloses an upper MacPherson strut step bearing for wheel suspensions in a motor vehicle, which comprises a metallic housing with a pot-shaped vertical section, a rubber buffer arranged in the housing, and a support piece, which can be connected to a shock absorber and protrudes into the rubber buffer rigidly connected to it with radially extending projections, wherein a radially directed housing flange forms an abutment for an annular spring buffer made of an elastomeric material, e.g., rubber, against which the top end of a coil spring of the MacPherson strut surrounding the shock absorber is supported. A cover plate of the housing, which covers the rubber buffer on its top side, can be fastened to a component of the vehicle body. The cover plate has a jacket ring, which projects downward beyond the spring buffer when viewed in the axial direction. A collar edge radially guiding the shock absorber is located on the underside of the housing. To optimize the action and the manufacture of such a MacPherson strut, the metallic housing is formed from sheet metal in one piece with the collar edge provided on its underside and is connected with the cover plate.

The height of the spring buffer, which increases in the circumferential direction and is predetermined at the design stage by the slope angle of the coil spring, leads to a rigidity of the spring buffer that decreases when viewed in this circumferential direction. This results in the loaded state in an increase in the spring deflection of the spring buffer in the circumferential direction, which causes a lateral sloping of the coil spring. To keep this lateral sloping of the spring buffer as small as possible, the spring buffer in the prior-art designs must consist of an elastomeric material of high hardness, which permits only small spring deflections and therefore also causes only a slight lateral sloping. This counteracts the requirements in terms of a high suspension comfort, for which purpose the elastomer should rather be made soft.

SUMMARY AND OBJECTS OF THE INVENTION

The primary object of the present invention is therefore to improve an upper MacPherson strut step bearing such that with equal space requirement and equal slope angle of the coil spring, greater spring deflections, with a greater suspension comfort, will cause an at least unchanged or smaller lateral sloping.

According to the invention, an upper MacPherson strut step bearing is provided for wheel suspensions in a motor vehicle, comprising a metallic housing that is pot-shaped in a vertical section, a rubber buffer arranged in the housing, and a support piece, which can be connected to a shock absorber and which protrudes with radially extending projections into the rubber buffer that is rigidly connected to the support piece. A radially directed housing flange forms an abutment for an annular spring buffer, against which the top end of the coil spring surrounding the shock absorber is supported and is connected to a cover plate of the housing. The cover plate can be fastened to a component of the motor vehicle and it covers the rubber buffer on its top side. A collar edge radially guides the shock absorber. The collar edge is located on the underside of the housing. The housing is metallic and the housing is formed from sheet metal in one piece with the collar edge provided on its underside and is clamped on (pinned on or fixed on) with the cover plate. The spring buffer includes recesses with a geometry varying in a circumferential direction as a function of a load in some areas on a side supported at the housing flange.

The housing is connected to a cover plate, which has a jacket ring projecting downward beyond a spring buffer, and into which extends the top end of the coil spring of the MacPherson strut, which top end is supported against the spring buffer. Such a design of the cover plate leads to a substantial improvement in the stability of the upper MacPherson strut step bearing and at the same time to a radially acting guiding for the top end of the coil spring of the MacPherson strut. In addition, the spring buffer made of rubber or the like is surrounded on its outer jacket surface, so that a lateral squeezing of the material of the spring buffer cannot occur any more. In addition, recesses are provided in the spring buffer in a MacPherson strut step bearing according to the present invention. These recesses are located on the side with which the spring buffer is supported against the radially directed housing flange. When viewed in the circumferential direction, these recesses are adapted to the cross sections of the spring buffer, which change as a function of the load occurring. This means that when viewed in the axial direction, the areas having a smaller cross section are provided with smaller recesses than are the areas of a larger cross section.

As a result, the MacPherson strut can be adjusted as needed in the axial direction. This can also be achieved by a different distance between the recesses. It is thus possible according to the present invention to obtain greater spring deflections without compromising the lateral slope of the MacPherson strut. It is thus possible to transmit greater spring deflections than in prior-art solutions. The recesses distributed over the circumference of the spring buffer may be, e.g., grooves continuous in the radial direction or simple pits of varying geometry. Other geometries are within the scope of the object of the present invention.

Two preferred exemplary embodiments of the MacPherson strut step bearing according to the present invention are shown in the drawings.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
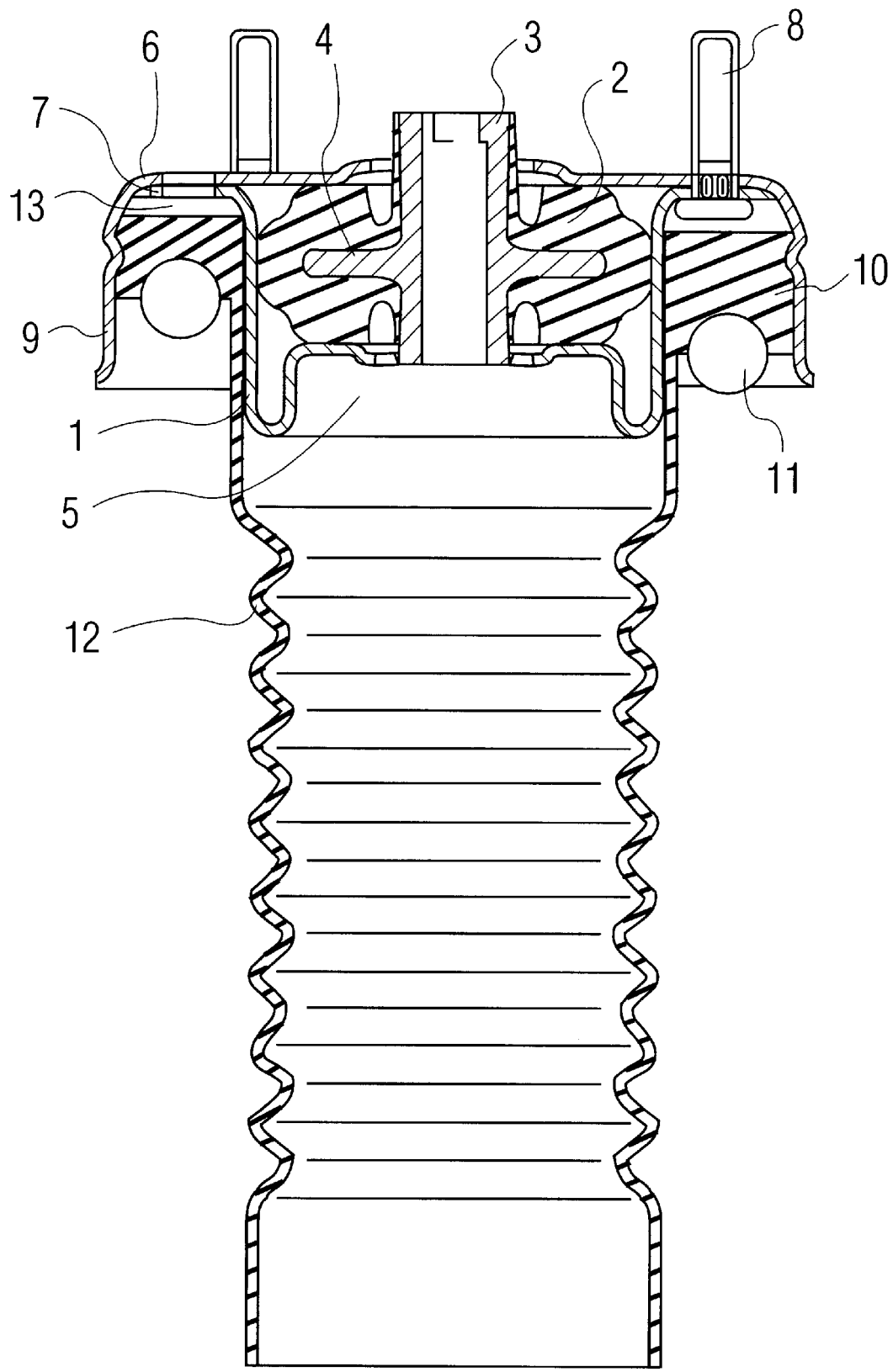
FIG. 1 is a vertical sectional view taken through a first MacPherson strut step bearing according to the invention.
Figure 2:
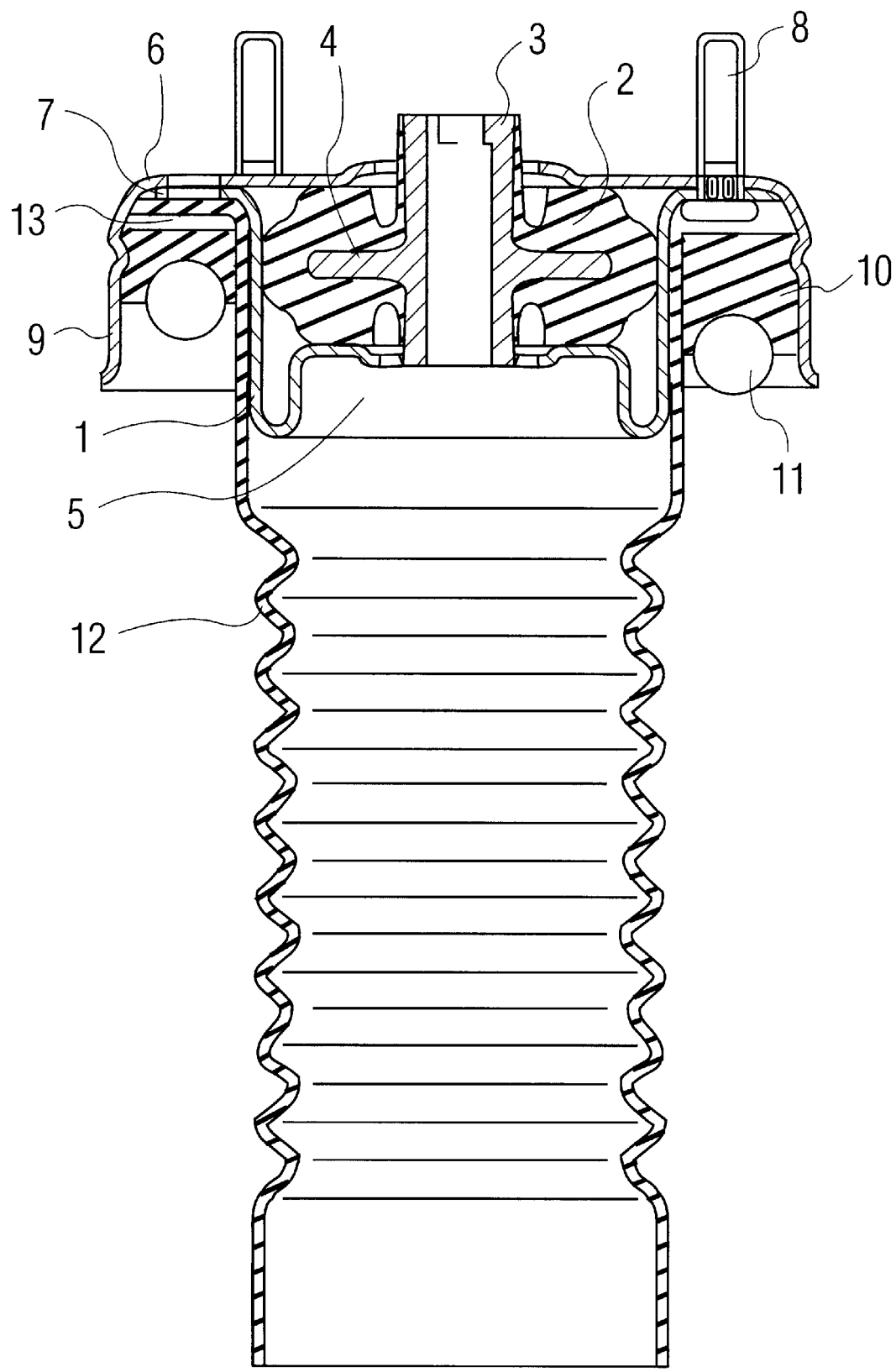
FIG. 2 is a vertical sectional view taken through a second MacPherson strut step bearing according to the invention.

The upper MacPherson strut bearing in the exemplary embodiments comprises a metallic housing 1, which is pot-shaped in the vertical section in a plane passing through the central axis of the MacPherson strut, a rubber buffer 2 arranged in the housing 1, and a support piece 3, which can be connected to the shock absorber, not shown in the drawing, and which has radially directed projections 4, which protrude into the material of the rubber buffer 2. A collar edge 5 is formed from sheet metal in one piece with the wall of the housing 1 on the underside of the housing 1. The top end of the shock absorber, not shown, extends into the collar edge 5, so that it is radially guided and held as a result. The support piece 3 is connected to the shock absorber through the hole in the support piece 3. The housing 1 is closed on the top side by a cover plate 6, which surrounds the support piece 3 with a clearance, so that the support piece 3 is cardanically movable in relation to the housing 1, utilizing a corresponding clearance in the bottom of the housing 1. The radially extending projections 4 may have recesses in some areas. A cardanically reduced characteristic can be achieved in the plane of loading as a result. The rubber buffer 2 is clamped in the housing 1 with the cover plate 6 in the conventional manner. The radially outwardly directed edge 7 of the pot-shaped housing 1 and the cover plate 6 are press fit (clamped on, pinned on or fixed on) with one another. This makes possible a final treatment of both the housing 1 and of the cover plate 6 before the assembly. Both components can thus be subjected to surface treatment, especially painting, already before they are connected. This is not possible in the case of a welding in a prior-art design. Fastening elements for the connection to a component of the motor vehicle are located on the cover plate 6. Bolts 8 for fastening, which pass through holes of both the radially directed housing flange 7 and of the cover plate 6, are shown. The cover plate 6 passes over at the outer edge into a jacket ring 9, which is directed downward in the axial direction and projects beyond a spring buffer 10, against which the top end of the coil spring 11 of the MacPherson strut is supported. As shown in FIGS. 1 and 2, the jacket ring 9 extends axially from the cover plate and covers a radial outside of the spring buffer 10. In the exemplary embodiment according to FIG. 1, a bellows 12 protectively surrounding the shock absorber is made in one piece with the spring buffer 10, so that the fastening of its top end is brought about by the spring buffer 10. In the exemplary embodiment corresponding to FIG. 2, the top end of the sealing bellows 12 has an outwardly directed flange, which is clamped between the spring buffer 10 and the housing flange 7. Both representations show clearly that the spring buffer 10 and optionally also the radial flange of the bellows 12 may have recesses 13 in the area of the bolts 8 for fastening the upper MacPherson strut bearing to a part of the motor vehicle.

In addition, recesses 13 varying over the circumference, which make it possible to obtain a specific axial damping characteristic of the spring buffer 10 without increasing the lateral slope of the coil spring 11, are provided in the spring buffer 10 on the side with which the spring buffer is supported against the radially directed housing flange 7. The shock absorber can thus be designed as needed in the axial direction. The recesses 13 are shown in FIGS. 1 and 2 as grooves that are continuous in the radial direction.

Figure 3:
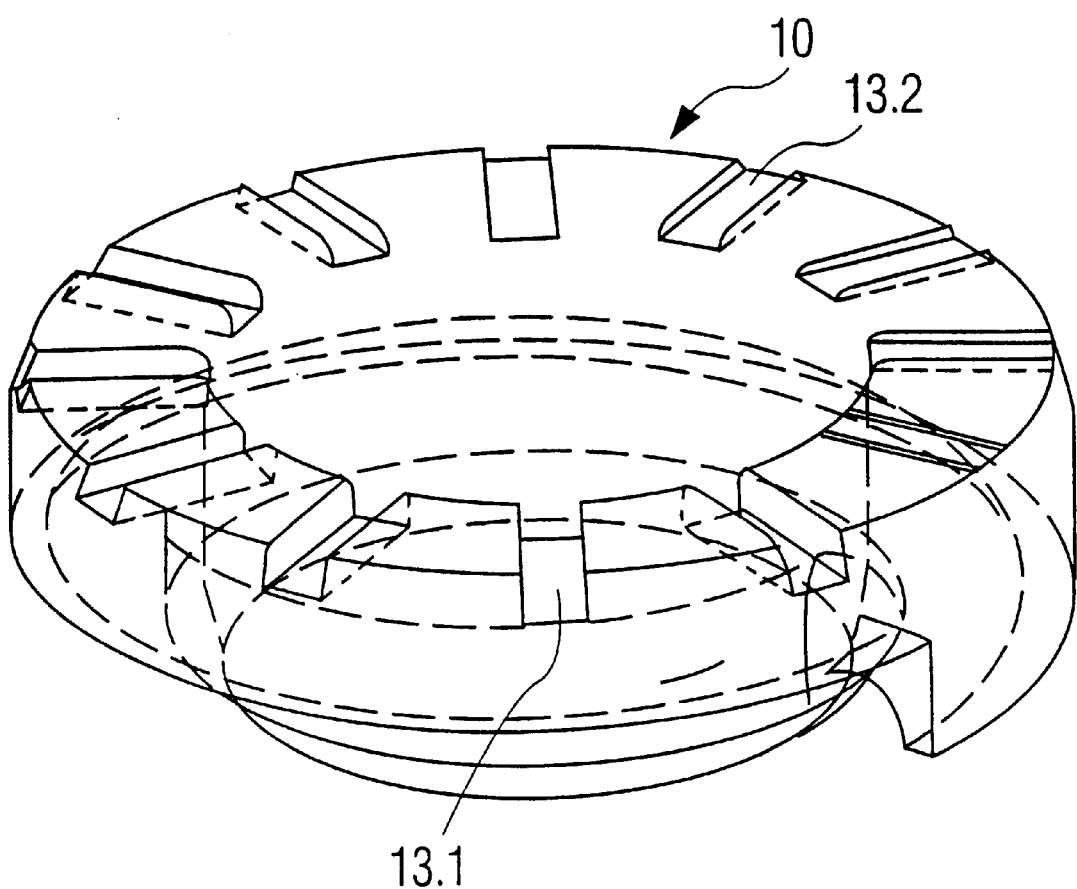
FIG. 3 is a spring buffer according to the present invention as an individual part.

FIG. 3 shows a spring buffer 10 according to the present invention as an individual part. The recesses 13 are located on the side with which the spring buffer 10 is supported against the radially directed housing flange 7.

When viewed in the circumferential direction, these recesses 13 are adapted to the cross sections of the spring buffer 10, which vary as a function of the occurring load. This means that the areas that have a small cross section when considering the axial direction are provided with larger recesses 13.1 than are the areas of a larger cross section. The dimensions of the recesses 13.2 are smaller there, at regions of larger axial dimension. As is apparent from FIG. 3, the spring buffer 10 shown there was provided with recesses of equal width, but varying depth. The recesses 13 can also have different slope angles when viewed in a circumferential direction.

While specific embodiments of the invention have been shown and described in detail to illustrate the application of the principles of the invention, it will be understood that the invention may be embodied otherwise without departing from such principles.

What is claimed is:

1. An upper MacPherson strut step bearing for wheel suspensions with shock absorber and coil spring in a motor vehicle, comprising:

a metallic housing that is pot-shaped in a vertical section, said housing including a radially directed housing flange and a collar edge for radially guiding the shock absorber, said collar edge being located on an underside of said housing, said metallic housing being formed from sheet metal in one piece with said collar edge;

a rubber buffer arranged in said housing;

a support piece which can be connected to the shock absorber, said support piece having radially extending projections protruding into said rubber buffer, said support piece being rigidly connected to said rubber buffer;

an annular spring buffer, said radially directed housing flange forming an abutment for said annular spring buffer, said annular spring buffer forming a support against which the top end of the coil spring surrounding the shock absorber is supported, said spring buffer having recesses on a side supported at said radially directed housing flange, said recesses having a geometry varying in a circumferential direction as a function of load on said spring buffer, said spring buffer being an elastomeric material;

a cover plate, said cover plate being connected to said annular spring buffer of said housing, said cover plate being fastenable to a component of the motor vehicle and covering said rubber buffer on a top side, and being press fit into attachment with said cover plate, said cover plate including a jacket ring extending axially beyond said annular spring buffer and covering a radial outside of said annular spring buffer, the coil spring extends inside said jacket ring.

2. The upper MacPherson strut step bearing in accordance with claim 1, wherein said recesses have different distances from one another when viewed in a circumferential direction.

3. The upper MacPherson strut step bearing in accordance with claim 1 wherein said recesses have different slope angles when viewed in a circumferential direction.

4. The upper MacPherson strut step bearing in accordance with claim 1 wherein individual said recesses have different depths.

5. The upper MacPherson strut step bearing in accordance with claim 1 wherein a depth of said recesses varies depending upon a position of said recesses with respect to a circumferential direction.

6. The bearing in accordance with claim 1, wherein:

said geometry varies to maintain an axial rigidity of said spring buffer substantially constant along said circumferential direction.

7. The bearing in accordance with claim 1, wherein:

an end of the coil spring in contact with said spring buffer is positioned at a slope angle of the coil spring;

said spring buffer has an axial thickness that varies to maintain said spring buffer adjacent said flange and adjacent said end of the coil spring.

8. The bearing in accordance with claim 7, wherein:

a magnitude of said recesses varies substantially inversely proportional to said axial thickness of said spring buffer.

9. The bearing in accordance with claim 7, wherein:

a spacing between said recesses varies substantially inversely proportional to said axial thickness of said spring buffer.

10. The bearing in accordance with claim 1, wherein:

said geometry of said recesses vary in said circumferential direction to reduce lateral sloping of the coil spring in a loaded state of the wheel suspension.

11. The bearing in accordance with claim 1, wherein:

said cover plate includes a jacket ring extending axially and covering a radial outside of said annular spring buffer, the coil spring extends inside said jacket ring.

12. An upper MacPherson strut step bearing for wheel suspensions with shock absorber and coil spring in a motor vehicle, comprising:

a pot-shaped metallic housing, said housing including a radially directed housing flange and a collar edge for radially guiding the shock absorber, said collar edge being located on an underside of said housing, said metallic housing being formed in one piece with said collar edge;

a rubber buffer arranged in said housing;

a support piece connectable with the shock absorber, said support piece having radially extending projections protruding into said rubber buffer, said support piece being rigidly connected to said rubber buffer;

an annular spring buffer, said radially directed housing flange forming an abutment for said annular spring buffer, said annular spring buffer forming a support against which a top end of the coil spring surrounding the shock absorber is supported, said spring buffer having recesses, each of said recesses having a geometry, said geometry varying between one of said recesses at one position with respect to a circumferential direction and another of said recesses at another position with respect to a circumferential direction as a function of load on said spring buffer, said annular spring buffer having a side supported at said radially directed housing flange, said geometry varies to maintain an axial rigidity of said spring buffer substantially constant along said circumferential direction, said spring buffer being an elastomeric material;

a cover plate, said cover plate being connected to said annular spring buffer of said housing, said cover plate being fastenable to a component of the motor vehicle and covering said rubber buffer on a top side, and being press fit into attachment with said cover plate.

13. An upper MacPherson strut step bearing for a wheel suspension with a shock absorber and a coil spring in a motor vehicle, comprising:

a pot-shaped metallic housing, said housing including a radially directed housing flange;

an annular spring buffer with one side positioned adjacent said radially directed housing flange, said annular spring buffer having another side forming a support against a top end of the coil spring, said spring buffer defining a plurality of recesses, a geometry of said recesses varying in a circumferential direction of said annular spring buffer to reduce lateral sloping of the coil spring in a loaded state of the wheel suspension.

14. The bearing in accordance with claim 13, wherein:

said geometry varies to maintain an axial rigidity of said spring buffer substantially constant along said circumferential direction.

15. The bearing in accordance with claim 13, wherein:

an end of the coil spring in contact with said spring buffer is positioned at a slope angle of the coil spring;

said spring buffer has an axial thickness that varies to maintain said one side adjacent said flange and said another side in contact with said end of the coil spring.

16. The bearing in accordance with claim 15, wherein:

a magnitude of said recesses varies substantially inversely proportional to said axial thickness of said spring buffer.

17. The bearing in accordance with claim 15, wherein:

a spacing between said recesses varies substantially inversely proportional to said axial thickness of said spring buffer.

18. An upper MacPherson strut step bearing for wheel suspensions with shock absorber and coil spring in a motor vehicle, comprising:

a pot-shaped metallic housing, said housing including a radially directed housing flange and a collar edge for radially guiding the shock absorber, said collar edge being located on an underside of said housing, said metallic housing being formed in one piece with said collar edge;

a rubber buffer arranged in said housing;

a support piece connectable with the shock absorber, said support piece having radially extending projections protruding into said rubber buffer, said support piece being rigidly connected to said rubber buffer;

an annular spring buffer, said radially directed housing flange forming an abutment for said annular spring buffer, said annular spring buffer forming a support against which a top end of the coil spring surrounding the shock absorber is supported, said spring buffer having recesses, each of said recesses having a geometry, said geometry varying between one of said recesses at one position with respect to a circumferential direction and another of said recesses at another position with respect to a circumferential direction as a function of load on said spring buffer, said annular spring buffer having a side supported at said radially directed housing flange;

a cover plate, said cover plate being connected to said annular spring buffer of said housing, said cover plate being fastenable to a component of the motor vehicle and covering said rubber buffer on a top side, and being press fit into attachment with said cover plate;

an end of the coil spring in contact with said spring buffer is positioned at a slope angle of the coil spring;

said spring buffer has an axial thickness that varies to maintain said spring buffer adjacent said flange and adjacent said end of the coil spring.

19. The bearing in accordance with claim 18, wherein:

one of a magnitude of said recesses and a spacing between said recesses varies substantially inversely proportional to said axial thickness of said spring buffer.

20. An upper MacPherson strut step bearing for wheel suspensions with shock absorber and coil spring in a motor vehicle, comprising:

a pot-shaped metallic housing, said housing including a radially directed housing flange and a collar edge for radially guiding the shock absorber, said collar edge being located on an underside of said housing, said metallic housing being formed in one piece with said collar edge;

a rubber buffer arranged in said housing;

a support piece connectable with the shock absorber, said support piece having radially extending projections protruding into said rubber buffer, said support piece being rigidly connected to said rubber buffer;

an annular spring buffer, said radially directed housing flange forming an abutment for said annular spring buffer, said annular spring buffer forming a support against which a top end of the coil spring surrounding the shock absorber is supported, said spring buffer having recesses, each of said recesses having a geometry, said geometry varying between one of said recesses at one position with respect to a circumferential direction and another of said recesses at another position with respect to a circumferential direction as a function of load on said spring buffer, said annular spring buffer having a side supported at said radially directed housing flange;

a cover plate, said cover plate being connected to said annular spring buffer of said housing, said cover plate being fastenable to a component of the motor vehicle and covering said rubber buffer on a top side, and being press fit into attachment with said cover plate;

said geometry of said recesses vary in said circumferential direction to reduce lateral sloping of the coil spring in a loaded state of the wheel suspension.

* * * * *